Dec. 30, 1969  K. H. BRECH  3,486,368
ULTRASONIC INSPECTION APPARATUS
Filed March 22, 1967  2 Sheets-Sheet 1

INVENTOR.
KILIAN H. BRECH
BY:
Ervin B. Steinberg

United States Patent Office 3,486,368
Patented Dec. 30, 1969

3,486,368
ULTRASONIC INSPECTION APPARATUS
Kilian H. Brech, Norwalk, Conn., assignor to Branson Instruments, Incorporated, Stamford, Conn., a corporation of Delaware
Filed Mar. 22, 1967, Ser. No. 625,249
Int. Cl. G01n 9/24
U.S. Cl. 73—67.9                                    9 Claims

ABSTRACT OF THE DISCLOSURE

In an ultrasonic pulse-echo test circuit using a dual transducer probe and a timing means for measuring the time interval between a first echo signal responsive to the interface between the probe and the object surface and a subsequent echo signal responsive to a change in acoustic impedance in the object, accuracy of measurement is improved by starting the operation of the timing circuit only in response to an echo signal denoting a change in acoustic impedance from a low value to a higher value, thereby excluding from the measurement the thickness of the couplant layer interposed between the probe and the object.

---

This application is related to copending application for the U.S. Letters Patent Ser. No. 532,037 filed Jan. 27, 1966 entitled "Ultrasonic Inspection Method and Apparatus."

In the patent application identified hereinabove there has been disclosed a novel ultrasonic method and apparatus for determining with great accuracy the thickness of plates, pipes, bars, etc., where only one surface is available. More specifically, the patent application discloses a measuring apparatus wherein a dual transducer probe, which includes acoustic coupling means interposed for thermal insulation purposes, is coupled to the entrant surface of an object whose thickness is to be measured. Ultrasonic energy is sent from a first electroacoustic transducer through the coupling means to the entrant surface of the object and a first echo signal is received by such transducer in response to the interface between the coupling means and the object's entrant surface. As the ultrasonic pulse enters the object and is propagated therein, it encounters a flaw or the rear surface of the object and, responsive to such change in acoustic impedance, a second reflection signal becomes apparent on a second transducer associated with the coupling means. The time internal between the first and the second reflection signals is a measure of the thickness of the object, or the distance of a flaw from the entrant surface. Most commonly, the coupling means is coupled to the entrant surface of the object by means of a couplant, such as water, glycerine, oil high temperature grease, etc., the purpose of such couplant being to exclude air and thereby provide an acoustic path from the coupling means to the entrant surface of the object.

The couplant material generally has a lower acoustic impedance than the material whose thickness is to be measured, e.g., metal. Typically, glycerine has a specific acoustic impedance of $2.5 \times 10^6$ kg./m.²s., oil $1.5 \times 10^6$ whereas aluminum has an impedance of $17.3 \times 10^6$, steel $46.7 \times 10^6$.

In an arrangement as described heretofore, it will be apparent that the initiation of the timing cycle responsive to the interface between the coupling material and the couplant causes an error in thickness measurement since the span of time during which the acoustic energy traverses the couplant is added to the measured time interval. Since the velocity of sound while traversing the couplant is much lower than that in a high impedance object, an error of considerable magnitude may occur. Additionally, since during measurement and when exerting manual holding pressure upon the transducer in contact with the object, the thickness of the interposed couplant layer may vary, erratic readings may be generated also. By triggering the timing circuit in such a way that it is started only in response to a signal which is truly representative of the time at which the acoustic energy enters the high acoustic impedance object, the above described couplant responsive error can be eliminated.

Hence, it is the primary object of this invention to provide an ultrasonic measuring apparatus of the type described wherein the timing circuit is started in response to a signal representative of sonic energy encountering the interface between a low acoustic impedance material and a high acoustic impedance material and traversing such interface in a direction toward the higher impedance material. This condition can be ascertained because of a phase inversion condition which manifests itself as the propagated acoustic signal encounters the entrant surface of the higher acoustic impedance material.

Another important object of this invention is the provision of an ultrasonic pulse-echo apparatus which includes a timing circuit, such circuit being started only upon the receipt of a signal of predetermined polarity.

Further and still other objects of this invention will be more clearly apparent by reference to the following description when taken in conjunction with the accompanying drawings, in which.

Figure 1:
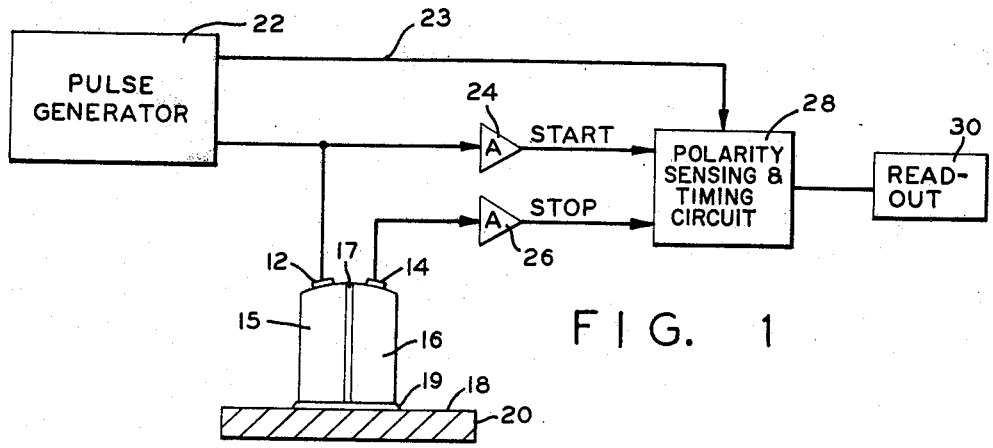
FIGURE 1 is a schematic block diagram of the ultrasonic inspection apparatus.

Referring now to the figures and FIGURE 1 in particular, numerals 12 and 14 identify a pair of electroacoustic transducers which are coupled by means of a respective coupling means 15 and 16 to the front surface 18 of an object 20 which is to be explored by ultrasonic energy. The transducers, made of piezoelectric material, such as lead zirconate titanate, are in side by side relation and may be enclosed in a single transducer housing to form a dual transducer probe, substantially as disclosed in copending application for U.S. Letters Patent Ser. No. 563,573 in the name of Robert V. Harris, filed July 7, 1966 and entitled "Dual Transducer Probe," now U.S. Patent No. 3,325,781 dated June 13, 1967. The coupling means 15 and 16 are made typically of polymeric thermoplastic material, such as methyl methacrylate, which material serves as thermal insulation in order to provide a heat barrier between a hot object surface 18 and the temperature sensitive piezoelectric transducer material 12 and 14. In order to exclude air so as to provide a transmission path for the ultrasonic energy between the coupling means and object 20, a layer of fluent couplant material 19, typically a film of water, glycerine, high temperature grease, oil and the like, is interposed between the object surface 18 and the coupling means 15 and 16. An acoustic barrier material 17, for instance cork, is used to suppress cross-coupling of the respective acoustic signals existing in the coupling means 15 and 16.

The electrical circuit includes an electrical signal pulse generator 22 for generating a train of high frequency electrical pulses, a set of pulse amplifiers 24 and 26, an electrical timing circuit 28, and an indicating or read-out circuit 30.

Operation of this apparatus may be visualized as follows:

The pulse generator 22 provides periodically a high frequency pulse to the transducer 12. The transducer causes the electrical energy to be changed to mechanical energy in the ultrasonic frequency range and a compressional wave energy pulse of ultrasonic frequency is transmitted through the coupling means 15, the couplant 19, and through the entrant surface 18 into the object 20. Concurrently with the generation of a pulse by the generator 22, an electrical inhibit signal is transmitted from the pulse generator 22 via the conductor 23 to the timing circuit 28 to inhibit operation of the timing circuit at this instant. As the ultrasonic search pulse from the transducer 12 traverses the coupling means 15, it encounters a change in acoustic impedance caused by the interface between the coupling means 15 and the object 20 and this change in specific acoustic impedance produces a reflection signal or echo which is sensed by the transducer 12, converted to an electrical signal, amplified by the amplifier 24 and used as a start signal to cause operation of the timing circuit 28.

As the initial ultrasonic signal pulse from the transducer 12 is propagated in the object 20, it encounters a change in acoustic impedance, either a flaw or the rear surface of the object 20, and such a change in specific acoustic impedance causes a second, subsequent reflection or echo signal, which passes through the couplant 19, the coupling means 16 and is sensed by the transducer 14. The transducer 14 converts the acoustic signal to an electrical signal which is amplified in the amplifier 26 and acts as a stop signal for the timing circuit 28.

The timing circuit 28, therefore, is operated for a duration which corresponds to the time responsive to the receipt of a first reflection signal arising at the interface between the coupling means 15 and the object's entrant surface 18 and a second reflection signal arising from within the object 20 and sensed by the transducer 14. In absence of a flaw and when measuring the thickness of a plate, such as the object 20, this time interval corresponds to twice the thickness of the object 20 and, hence, this time interval is a measure of the thickness of the object. The time interval is made apparent by means of suitable read-out means 30, such as a digital meter, a meter having a movable pointer, a cathode ray tube and the like.

Figure 3:
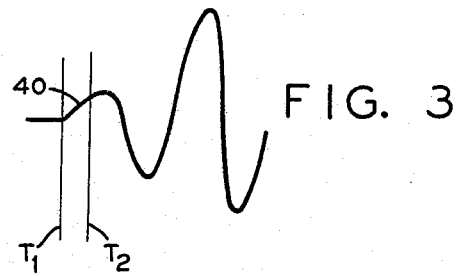
FIGURE 3 is an illustration of the electrical signal provided responsive to the interface between a solid coupling means and a fluent couplant.
Figure 2:
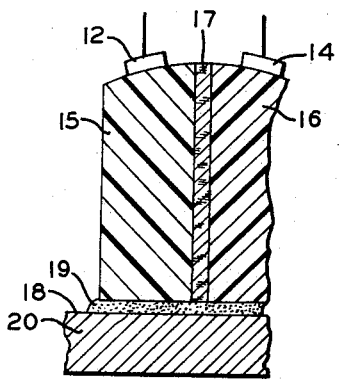
FIGURE 2 is an enlarged illustration showing the engagement between the transducer probe and the test object.

As will be noted by reference to FIGURE 2, the ultrasonic pulse signal from the transducer 12 passing through the coupling means 15 into the object 20 encounters two distinct changes in acoustic impedence. The first change in specific acoustic impedance manifests itself at the interface between the coupling means 15 and the couplant 19. If the coupling means 15 is made of methyl methacrylate and the couplant is oil, there is a change to a slightly lower impedance, the specific acoustic impedance being approximately $3.2 \times 10^6$ for the coupling means and $1.5 \times 10^6$ kg./m.$^2$s. for the couplant. If the pulse propagated is a positive wave front, the conditions are substantially as illustrated in FIGURE 3 wherein at the time $T_1$, as sensed by the transducer 12, a positive going signal occurs as the pulse is propagated from the coupling means 15 into the couplant 19. The signal 40 would continue substantially as shown if the thickness of the couplant were to continue.

Figure 4:
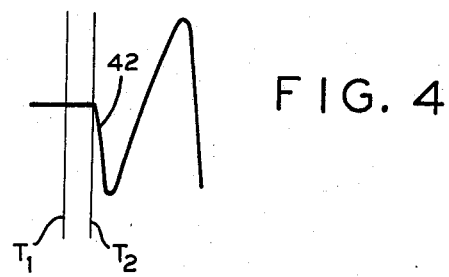
FIGURE 4 is an illustration of the signal wave shape responsive to the interface between a fluent couplant and a solid object of higher acoustic impedance.

The second interface which the acoustic signal encounters at the subsequent time $T_2$, as sensed by the transducer 12, is that existing between the couplant 19 and the entrant surface 18 of the object 20. At this particular instant there occurs a large change in acoustic impedance, for instance oil and steel, a difference between $1.5 \times 10^6$ and $46.7 \times 10^6$ kg./m.$^2$s. Thus, the acoustic signal encounters a change from a relatively low to a high impedance. This change in acoustic impedance from a low impedance to a higher impedance causes a reflection which manifests itself as a phase inversion. FIGURE 4, causing a negative going signal portion 42. The transducer 12, of course, is responsive to the composite of the signals 40 and 42 and, therefore, receives initially a positive going signal portion 43 between the time signal $T_1$ and $T_2$ and subsequently a sharply negative going signal responsive to the interface between the couplant 19 and the surface 18 of the object. The time interval between $T_1$ and $T_2$ represents twice the thickness of the couplant film.

Figure 5:
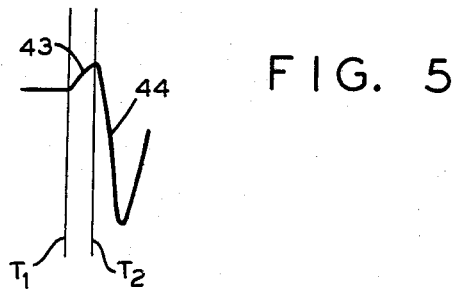
FIGURE 5 is a representation of the signal wave shape apparent on the transducer, which signal is the composite of the wave shapes in FIGURES 3 and 4.

It will be apparent that, if the object is relatively thin or the couplant 19 is a relatively thick layer, a considerable error of measurement exists in the event that the time interval is started responsive to the receipt of a reflection signal arising from the interface between the coupling means 15 and the couplant 19, instead of the reflection signal responsive to the interface between the couplant 19 and the object 20. This error is magnified since, due to the low propagation velocity of sound in the couplant, even a small thickness of couplant material manifests itself as a much greater thickness of metal. Also, since the couplant material is fluent and may flow under the influence of heat and/or pressure, e.g. when testing a hot object, errors in measurement occur and inconsistent thickness values are discerned. Therefore, unless a provision is made to start the time interval only in response to a reflection signal arising from the interface between a change in material from a low acoustic impedance to a higher impedance, the accuracy of thickness measurement may be impaired. The above described sources of error can be eliminated by arranging the timing circuit to be polarity sensitive, i.e. it is started only upon the receipt of a negative going pulse, the portion 44 shown in FIGURE 5 and starting at the time $T_2$.

Figure 6:
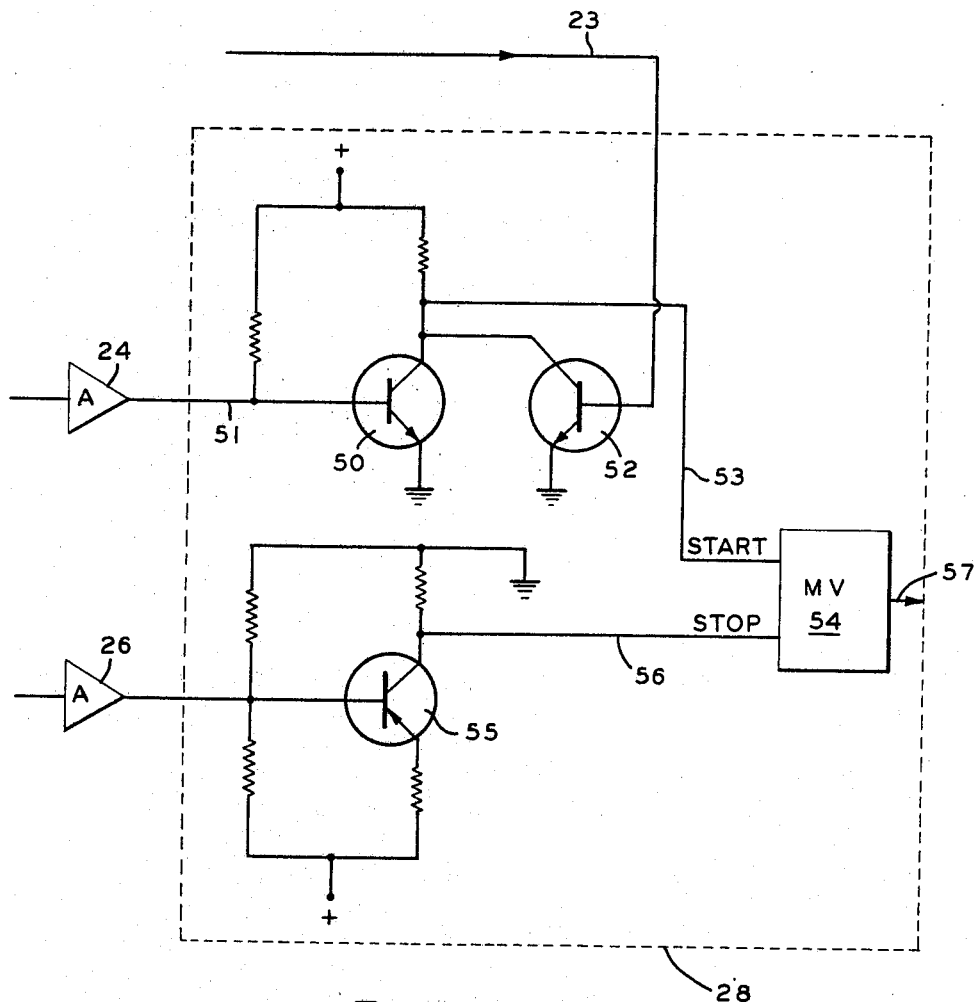
FIGURE 6 is a schematic electrical diagram of a timing circuit.

FIGURE 6 shows in greater detail the timing circuit 28. It comprises a pair of detector circuits which include respectively the transistors 50 and 55, a transistor 52 for shunting the detector circuit transistor 50, and a multivibrator 54.

When the pulse generator 22 sends an inhibit signal via the conductor 23 to the timing circuit, the transistor 52 shunts the transistor 50 and the detector circuit is temporarily rendered insensitive. The transistor 50 is connected so that it is sensitive to a negative signal coming from the amplifier 24 along the conductor 51. This negative signal produces a positive output signal along the conductor 53 for starting the multivibrator 54. The second and subsequent reflection signal coming from the amplifier 26 is conducted to the transistor 55 which is sensitive to a negative input signal and delivers an output signal along the conductor 56 to the multivibrator 54 for stopping operation of the multivibrator. The output from the multivibrator, appearing along conductor 57, is sent to an indicating circuit which may include a time-to-voltage conversion circuit for providing an electrical signal which is proportional to the period of operation of the multivibrator. The multivibrator may be of any conventional type, a typical circuit being shown in the Air Force Manual Number 52–8 "Electrical Circuit Analysis" page 8–52.

For other and further details with respect to the operation of this apparatus reference is made to the patent application identified hereinabove.

As clearly illustrated and described, the circuit shown hereinabove excludes from measurement the thickness of the couplant material and thereby provides improved accuracy, especially when testing materials which are relatively thin.

What is claimed is:

1. An apparatus for exploring an object comprising: electro-acoustic transducer means; acoustic coupling means disposed for acoustically coupling said transducer means through a couplant film to the entrant surface of an object to be explored, said couplant film being placed between said coupling means and object surface;

a pulse generator coupled for periodically energizing said transducer means whereby said transducer means is caused periodically to transmit an ultrasonic search pulse of predetermined polarity through said coupling means and film into the object, the acoustic impedance of said object being higher than that of said couplant film, and said coupling means being of higher acoustic impedance than that of said film;

electrical timing means coupled to said transducer means and including a polarity sensitive means for starting a timing cycle responsive to the receipt of a first electrical signal caused by a reflection of ultrasonic energy arising as an ultrasonic search pulse traverses the interface between the couplant film and the entrant surface of the object, and to terminate said respective timing cycle responsive to the receipt of a subsequent second electrical signal caused by a reflection of ultrasonic energy arising as the ultrasonic search pulse intercepts an acoustic discontinuity below said entrant surface;

said polarity sensitive means causing said timing means to start the timing cycle only if said first electrical signal is of a polarity denoting the search pulse passing from a relatively low acoustic impedance material to one having a higher acoustic impedance, and means coupled to said timing means to inhibit operation thereof when said pulse generator energizes said transducer means.

2. An apparatus for exploring an object as set forth in claim 1 wherein said coupling means is made of polymeric thermoplastic material and the object is metal.

3. An apparatus for exploring an object as set forth in claim 2 wherein said couplant film is a liquid.

4. An apparatus for exploring an object as set forth in claim 1, said polarity sensitive means comprising a detector circuit sensitive to a signal denoting a phase inversion of the acoustic signal.

5. An apparatus for exploring an object comprising:

a transducer probe comprising a first and a second electro-acoustic transducer disposed substantially in juxtaposition;

first and second acoustic coupling means associated respectively with said first and second transducers for acoustically coupling each of said transducers through a respective coupling means and a couplant film to the entrant surface of an object to be explored, said couplant film being interposed between said coupling means and the object surface;

acoustic shielding means disposed between said first and second coupling means for suppressing cross-coupling of acoustic signals traversing said respective coupling means;

an electrical pulse generator coupled to said first transducer for periodically energizing said first transducer whereby said transducer is caused periodically to transmit an ultrasonic search pulse of predetermined polarity through said first coupling means and couplant film into the object, the acoustic impedance of said object being higher than that of said couplant film, and said coupling means being of higher acoustic impedance than that of said film;

electrical timing means coupled to said first and second transducers and including a polarity sensitive means for starting a timing cycle responsive to the generation of an electrical signal by said first transducer, said signal being caused by a reflection of ultrasonic energy arising as the ultrasonic search signal traverses the interface between the couplant film and the entrant surface of the object, and to terminate said respective timing cycle response to the generation of a subsequent electrical signal by said second transducer, said subsequent signal being caused by a reflection of ultrasonic energy arising as the ultrasonic search pulse intercepts an acoustic discontinuity below the entrant surface;

said polarity sensitive means being coupled in series with the electrical signal circuit from said first transducer for starting the timing cycle only if said first electrical signal is of a polarity denoting the search pulse passing from a relatively low acoustic impedance material to one having higher acoustic impedance, and means coupled between said pulse generator and said timing means for inhibiting operation of said timing means when said pulse generator energizes said first transducer.

6. An apparatus for exploring an object as set forth in claim 5, said timing means including a multivibrator.

7. An apparatus for exploring an object as set forth in claim 5, said first and second transducers being coupled to said timing means in series with respective amplifiers.

8. An apparatus for exploring an object as set forth in claim 5, said first and second coupling means being made of polymeric thermoplastic material.

9. An apparatus for exploring an object as set forth in claim 5, said polarity sensitive means comprising a detector circuit sensitive to an electrical signal denoting a phase inversion of the acoustic signal.

References Cited

UNITED STATES PATENTS

| | | | |
|---|---|---|---|
| 3,169,393 | 2/1965 | Stebbins | 73—67.9 |
| 3,262,306 | 7/1966 | Henry | 73—67.9 |

FOREIGN PATENTS

| | | |
|---|---|---|
| 842,653 | 7/1960 | Great Britain. |
| 978,183 | 12/1964 | Great Britain. |

OTHER REFERENCES

Goldman, R.: Ultrasonic Technology, Reinhold Publishing Corp., New York, 1962, pp. 263–267.

RICHARD C. QUIESSER, Primary Examiner

JOHN P. BEAUCHAMP, Assistant Examiner